US009094451B2

(12) United States Patent
Sobko et al.

(10) Patent No.: US 9,094,451 B2
(45) Date of Patent: Jul. 28, 2015

(54) SYSTEM AND METHOD FOR REDUCING LOAD ON AN OPERATING SYSTEM WHEN EXECUTING ANTIVIRUS OPERATIONS

(71) Applicant: Kaspersky Lab ZAO, Moscow (RU)

(72) Inventors: Andrey V. Sobko, Moscow (RU); Maxim V. Yudin, Moscow (RU); Pavel N. Mezhuev, Moscow (RU); Ilya B. Godunov, Moscow (RU); Maxim A. Shiroky, Moscow (RU)

(73) Assignee: KASPERSKY LAB ZAO, Moscow (RU)

( * ) Notice: Subject to any disclaimer, the term of this patent is extended or adjusted under 35 U.S.C. 154(b) by 0 days.

(21) Appl. No.: 14/449,736

(22) Filed: Aug. 1, 2014

(65) Prior Publication Data

US 2015/0163231 A1    Jun. 11, 2015

(30) Foreign Application Priority Data

Dec. 5, 2013  (RU) .................................. 2013153767

(51) Int. Cl.
*G06F 21/56* (2013.01)
*H04L 29/06* (2006.01)
(Continued)

(52) U.S. Cl.
CPC .............. *H04L 63/145* (2013.01); *G06F 21/50* (2013.01); *G06F 21/554* (2013.01); *G06F 21/56* (2013.01);
(Continued)

(58) Field of Classification Search
CPC .................................. H04L 63/14; G06F 21/05
USPC ................................. 726/22–25; 713/187–188
See application file for complete search history.

(56) References Cited

U.S. PATENT DOCUMENTS 7,188,367 B1    3/2007   Edwards et al.
7,530,106 B1    5/2009   Zaitsev et al.
(Continued)

FOREIGN PATENT DOCUMENTS

RU            91205        1/2010
RU            24779        3/2013
(Continued)

OTHER PUBLICATIONS

Venter, H. S., and Jan HP Eloff. "A taxonomy for information security technologies." Computers & Security 22.4 (2003): 299-307.*
(Continued)

*Primary Examiner* — Madhuri Herzog
(74) *Attorney, Agent, or Firm* — Patterson Thuente Pedersen, P.A.

(57) ABSTRACT

An initial trust status is assigned to a first object, the trust status representing one of either a relatively higher trust level or a relatively lower trust level. Based on the trust status, the first object is associated with an event type to be monitored, where the event type is selected from among: essential events, occurrence of which is informative as to trust status evaluating for an object, and critical events, including the essential events, and additional events, occurrence of which is informative as to execution of suspicious code. Occurrences of events relating to the first object are monitored. In response to the first object being assigned the relatively higher trust level, only the essential events are monitored. In response to the first object being assigned the relatively lower trust level, the critical events are monitored. A need for performing malware analysis is determined based on the trust status of the first object and the event type. In response to determination of the need for performing the malware analysis, the malware analysis for the first object is either performed, or not.

25 Claims, 5 Drawing Sheets

(51) Int. Cl.
*G06F 21/50* (2013.01)
*G06F 21/55* (2013.01)

(52) U.S. Cl.
CPC .......... *G06F 21/564* (2013.01); *G06F 21/565* (2013.01); *G06F 21/566* (2013.01); *H04L 63/1408* (2013.01); *H04L 63/1416* (2013.01); *H04L 63/1441* (2013.01); *H04L 63/14* (2013.01); *H04L 63/1425* (2013.01)

(56) References Cited

U.S. PATENT DOCUMENTS

| | | | |
|---|---|---|---|
| 8,042,186 B1 | 10/2011 | Polyakov et al. | |
| 8,078,886 B2 | 12/2011 | Dotan | |
| 8,079,085 B1 | 12/2011 | Wu et al. | |
| 8,117,441 B2 * | 2/2012 | Kurien et al. | 713/164 |
| 8,205,257 B1 * | 6/2012 | Satish et al. | 726/22 |
| 8,205,261 B1 * | 6/2012 | Andruss et al. | 726/24 |
| 8,347,085 B2 | 1/2013 | Kurien et al. | |
| 8,370,947 B2 | 2/2013 | Zaitsev et al. | |
| 8,479,286 B2 | 7/2013 | Dalcher | |
| 8,484,483 B2 | 7/2013 | Dotan | |
| 8,584,254 B2 | 11/2013 | Cui et al. | |
| 8,589,681 B1 | 11/2013 | Fanton et al. | |
| 8,769,693 B2 * | 7/2014 | Pfeifer et al. | 726/24 |
| 2007/0006304 A1 | 1/2007 | Kramer et al. | |
| 2007/0079377 A1 * | 4/2007 | Pagan | 726/24 |
| 2010/0199357 A1 | 8/2010 | Hoffman et al. | |
| 2011/0083186 A1 | 4/2011 | Niemela et al. | |
| 2013/0145463 A1 * | 6/2013 | Ghosh et al. | 726/22 |
| 2013/0276112 A1 | 10/2013 | Dalcher | |
| 2013/0298243 A1 | 11/2013 | Kumar et al. | |
| 2013/0298244 A1 | 11/2013 | Kumar et al. | |

FOREIGN PATENT DOCUMENTS

| | | |
|---|---|---|
| RU | 2012141475 | 4/2014 |
| WO | WO2013166126 | 11/2013 |

OTHER PUBLICATIONS

European Search Report for European Application No. EP14183230 dated Mar. 27, 2015.
Russian Search Report for Russian Application No. 2013153767/08 (084048) dated Dec. 5, 2013. English translation not provided.

* cited by examiner

SYSTEM AND METHOD FOR REDUCING LOAD ON AN OPERATING SYSTEM WHEN EXECUTING ANTIVIRUS OPERATIONS

PRIOR APPLICATION

This Application claims the benefit of Russian Federation Patent Application No. 2013153767, filed Dec. 5, 2013, the content of which is incorporated by reference herein.

FIELD OF THE INVENTION

The invention relates generally to information processing systems and security and, more particularly, to systems and methods for improving efficiency of anti-malware operations.

BACKGROUND OF THE INVENTION

Malicious software, commonly referred to as malware, describes any software designed for infiltration into a computer system in order to gain control over such a system and to perform unauthorized actions, such as theft of confidential information, for example. A wide variety of malware exists today, including network worms, trojan programs, rootkits, exploits and computer viruses. Therefore, many owners of computer devices (for example, personal computers) use various antivirus applications for protection, which allow to detect and remove malicious programs. Usually, today's antivirus applications are multi-component complex systems, which include various protection modules.

One of the protection technologies is signature scanning, which allows to identify known malicious programs among all programs installed in a computer system. For this purpose, this technology has a database which contains information on known malicious programs—for example, in the form of hashes of such programs. Such databases are usually updated by receiving information on newly detected malicious programs from a manufacturer of antivirus security through distribution on the Internet.

Another protection technology is the technology known as "whitelisting", which ensures monitoring of applications using "white" lists of trusted programs. This technology allows not to restrict and to permit operation of software in a computer system, if the software is classified as trusted.

Another technology, which is also used in contemporary antivirus applications, is behavioral detection, which allows to analyze the behavior of applications. This technology can be based, for example, on the interception of the application programming interface (API) functions called by an application, and on their subsequent analysis. It should be noted that it is not the API functions themselves that are studied, but the sequence of the calls for various API functions and their parameters. The analysis identifies various suspicious actions, such as an attempt to access system files by a non-trusted process (for example, a process launched from a file which appeared in the system rather recently and has not been checked by an antivirus application). After the identification of suspicious actions, an analysis is performed, and a decision is made regarding the maliciousness of the software.

The above-described technologies, used jointly to detect malicious programs, have one substantial deficiency. This deficiency is related to the fact that a malicious code (for example, due to a vulnerability of the program or of the operating system) can infiltrate the address space of a trusted process and continue to be executed with the rights of the trusted process. Then an access attempt by the infiltrated malicious code will not be considered suspicious and will be completed, because it will be completed (apparently) by the trusted process.

In known approaches for detecting malicious programs, monitoring, analysis, and evaluation of the behavior of all the processes, are very resource-consuming tasks, the performance of which can cause the so-called "freezing" of the applications run by the user or of the whole operating system. A solution to these, and related issues, is needed.

SUMMARY OF THE INVENTION

One aspect of the invention is directed to selectively performing malware analysis of objects residing in a computer system. An initial trust status is assigned to a first object, the trust status representing one of either a relatively higher trust level or a relatively lower trust level. Based on the trust status, the first object is associated with an event type to be monitored, where the event type is selected from among: essential events, occurrence of which is informative as to trust status evaluating for an object, and critical events, including the essential events, and additional events, occurrence of which is informative as to execution of suspicious code. Occurrences of events relating to the first object are monitored. In response to the first object being assigned the relatively higher trust level, only the essential events are monitored. In response to the first object being assigned the relatively lower trust level, the critical events are monitored. A need for performing malware analysis is determined based on the trust status of the first object and the event type. In response to determination of the need for performing the malware analysis, the malware analysis for the first object is either performed, or not.

BRIEF DESCRIPTION OF THE DRAWINGS

The invention may be more completely understood in consideration of the following detailed description of various embodiments of the invention in connection with the accompanying drawings, in which.

Figure 1:
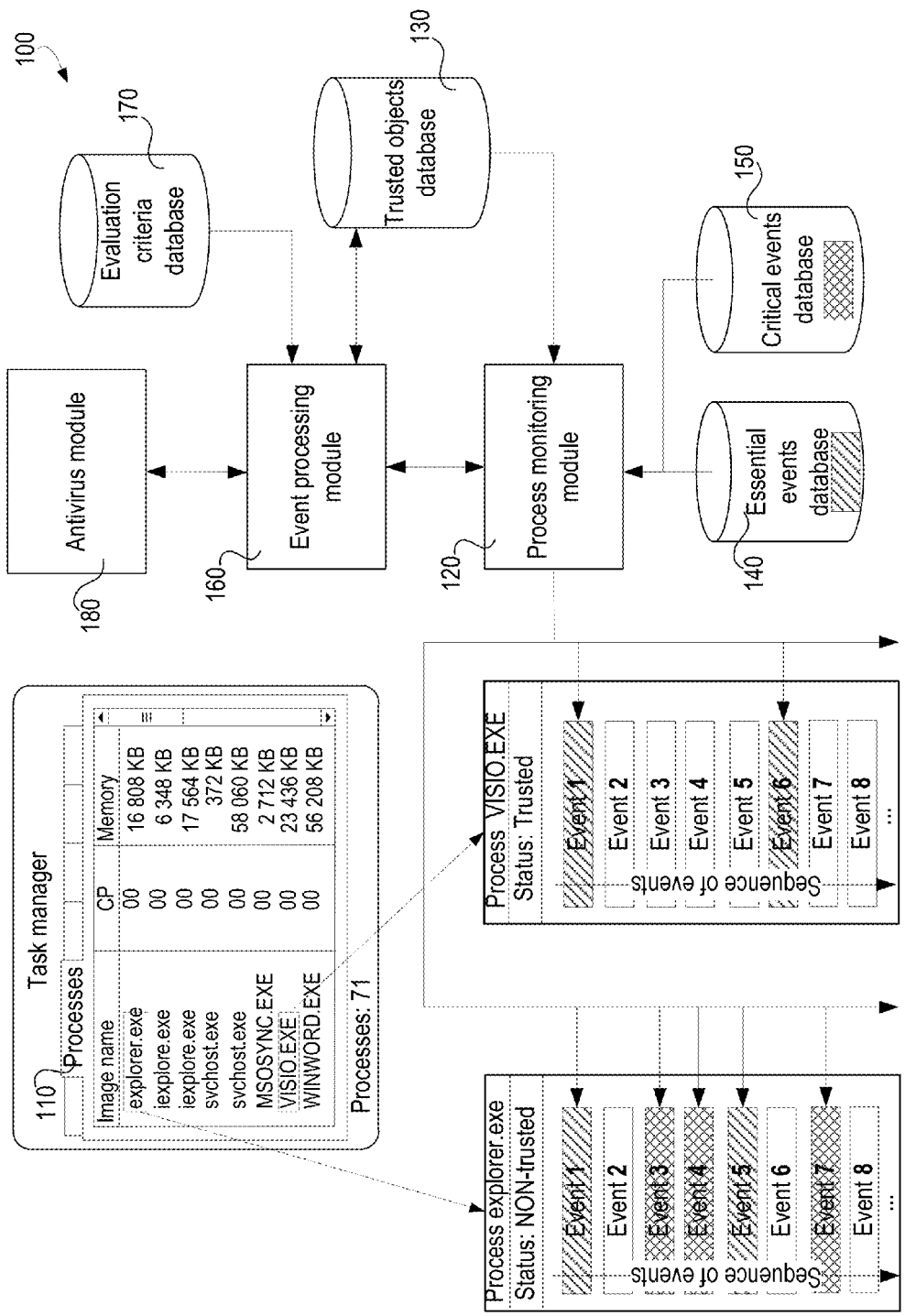
FIG. 1 is a diagram illustrating a system for determining selectively performing malware analysis based on determining the dynamic trust status of objects, according to one aspect of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

I Glossary

The following Glossary sets forth definitions of terms used herein. This Glossary is applicable to only the present Application.

"Antivirus analysis," "malware analysis," "security-related analysis"—performance of a detailed evaluation as to possible maliciousness of an object. One or more of a variety of different techniques can be employed, including signature analysis (i.e., checking for the presence of known patterns in the object), heuristic techniques, emulation, and the like. Antivirus analysis of a process involves examining all of the events occurring during the execution of the associated program code. In general, antivirus analysis is more computationally expensive (i.e., involving more time, more processor cycles, etc.) than a trust status evaluation.

"Computer," "computer system", and "computing System"—an electronic device or system of inter-operable electronic devices containing hardware including one or more processors, data storage, input-output devices; and capable of storing and manipulating information according to software instructions carried out by the hardware. It can be one physical machine, or it can be distributed among multiple physical machines, such as by role or function, or by process thread in the case of a cloud computing distributed model. Examples include desktop or mobile personal computers (PCs), smartphones, and tablets, as well as networking devices, such as routers, switches, and the like. Computer systems can be stand-alone devices, or embedded devices that are part of a larger device or system.

"Critical event"—an event, the occurrence of which is informative as to execution of suspicious or malicious code. Critical events are also essential events.

"Data storage"—one or more electronic hardware devices that stores data in a physical storage medium. Examples include volatile storage (e.g., random-access memory (RAM), whether static or dynamic), non-volatile storage (e.g., electrically-erasable programmable read-only memory, magnetic disk, etc.).

"Essential event"—an event pertaining to an object, which is to be monitored and analyzed regardless of the trust status of that object, and the occurrence of which is informative as to trust status setting of an object. An essential event is not necessarily a critical event, although it may be.

"Event"—an action or occurrence taking place in a computer system that is detectable by a monitoring process. Examples include the launching or closing of a program or data file, a user action (e.g., clicking a mouse button), receipt or creation of a file, system occurrences (e.g., memory violation) etc.

"Interception"—detecting an occurrence of a start of an event, such as the launching of a process, for instance, and holding up the completion of that event until a specific action relating to that event is initiated or completed.

"Malware"—malicious code, or software; any software used to disrupt computer operation, gather sensitive information, or gain access to a computer system in an unauthorized manner. Malware can appear in the form of code, script, active content, and other software. Examples include, viruses, worms, Trojans, ransom-ware, scare-ware, rootkits, bootkits, spyware, etc.

"Module"—a real-world device, component, or arrangement of components implemented using hardware, or as a combination of hardware and software, such as by a microprocessor system and a set of program instructions that adapt the module to implement the particular functionality, which (while being executed) transform the microprocessor system into a special-purpose device. A module can also be implemented as a combination of the two, with certain functions facilitated by hardware alone, and other functions facilitated by a combination of software-controlled hardware. In certain implementations, at least a portion, and in some cases, all, of a module can be executed on the processor(s) of one or more computers that execute an operating system, system programs, and application programs, while also implementing the module using multitasking, multithreading, distributed (e.g., cluster, peer-peer, cloud, etc.) processing where appropriate, or other such techniques. In addition, a module can itself be composed of more than one sub-modules, each of which can be regarded as a module in its own right.

"Object"—a process, a file, or other extant data structure in the computer system, e.g., a piece of software code, or data structure, stored in computer hardware. Examples include files, programs, data packets, etc. The term "object" also refers to related files and processes such that a file from which a process is created, or which stores data structures of a running process, constitutes a common object.

"Operating system," ("OS")—software executable on computer hardware that handles functions for interaction with network ports and connections, peripherals, scheduling of tasks, allocation of data storage, and presents a default interface to the user when no application program is running Examples include the Windows™ family of operating systems by Microsoft Corporation, Mac OS by Apple Inc., Unix, Linux, iOS, Android, etc.

"Process"—a container of resources, loaded into the memory space of a computer system, which are allocated and utilized to execute the program code of an executable file. A process has a virtual address space within the computer system's physical data storage, and is managed by the operating system. The required sections of an executable file from which the process is loaded are loaded into the virtual address space of the process, together with the dynamic-linked libraries (DLL) related to the file. The address space of a process also stores various data structures, such as stacks. Each process represents at least one execution thread, each of which uses system resources (for example, files, system registry keys, synchronization objects, etc.) and the virtual address space of the process. The execution of the program code occurs by way of execution of the threads of the associated process.

"Processor"—electronic hardware part of a computer system that carries out the instructions of a computer program by performing basic arithmetical, logical, temporary storage, and input/output operations of the system. Typically, a processor is implemented as a microprocessor (i.e., integrated on a single chip), though this definition includes processor circuits that are implemented on multiple interconnected integrated circuits. Modern-day processors typically include multiple processing cores and can distribute workload among the multiple processing cores.

"Suspicious code," "suspicious program," "suspicious process," or "suspicious object"—an object that exhibits behavior, or one or more characteristics of malware. This object may or may not actually be malicious, but its behavior or other characteristic generally gives rise to added scrutiny to be paid to the object by security-related software or services.

"Trust status"—An indication associated with an object that represents a degree of trust-worthiness of that object from a maliciousness perspective. The trust status can be binary (i.e., "trusted"/"non-trusted," or can represent a continuum of trustworthiness. In one sense, the trust status can be considered as a representation of a level of suspicion of an object based on an existing knowledge base such as a whitelist, blacklist, certificate authority, owner of a digital signature, or the like. In general, the trust status of an object is obtained in a computationally inexpensive manner (i.e., involving less time, fewer processor cycles, etc.) than an antivirus analysis.

II Description of Preferred Embodiments

Aspects of the present invention can be implemented as part of a computer system. The computer system can be one physical machine, or can be distributed among multiple physical machines, such as by role or function, or by process thread in the case of a cloud computing distributed model. In various embodiments, aspects of the invention can be configured to run in virtual machines that in turn are executed on one or more physical machines. It will be understood by persons of skill in the art that features of the invention may be realized by a variety of different suitable machine implementations.

The system includes various modules, each of which is constructed, programmed, configured, or otherwise adapted, to carry out a function or set of functions. The term module as used herein means a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the module to implement the particular functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor(s) of one or more computers that execute an operating system, system programs, and application programs, while also implementing the module using multitasking, multithreading, distributed (e.g., cluster, peer-peer, cloud, etc.) processing where appropriate, or other such techniques. Accordingly, each module can be realized in a variety of suitable configurations, and should generally not be limited to any particular implementation exemplified herein, unless such limitations are expressly called out. In addition, a module can itself be composed of more than one sub-modules, each of which can be regarded as a module in its own right. Moreover, in the embodiments described herein, each of the various modules corresponds to a defined functionality; however, it should be understood that in other contemplated embodiments, each functionality may be distributed to more than one module. Likewise, in other contemplated embodiments, multiple defined functionalities may be implemented by a single module that performs those multiple functions, possibly alongside other functions, or distributed differently among a set of modules than specifically illustrated in the examples herein.

The objects and characteristics of this invention and the methods for achieving these objects and characteristics will become clear by reference to sample embodiments. However, this invention is not limited to the sample embodiments disclosed below and can be implemented in various forms. The substance provided in the description represents nothing else than specific details required in order to help technology specialists to fully understand the invention; this invention is defined within the scope of the enclosed claim.

FIG. 1 is a diagram illustrating a system for determining selectively performing malware analysis based on determining the dynamic trust status of objects, according to one embodiment of the invention. Advantageously, the exemplary system avoids having to analyze all of the processes for presence of a malicious code, which would be a very resource-intensive task, the performance of which would cause delays in the execution of applications, sometimes to the point of the system or user interface becoming unresponsive. In order to solve the above problem, one aspect of the present invention reduces the number of events to be checked by the antivirus application by setting, and later adjusting, the trust status of processes, files, and other objects. Accordingly, the need for checking an occurring event is determined depending on the trust status of the object. The term "object" in the present context refers to a process, a file, or other extant data structure in the computer system. Moreover, the term "object" also refers to related files and processes such that a file from which a process is created, or which stores data structures of a running process, constitutes a common object.

It should be noted that a process is, in fact, a container of resources which are allocated and utilized to execute the program code of an executable file. A process has a virtual address space within the computer system's physical data storage, and is managed by the operating system. The required sections of an executable file from which the process is loaded are loaded into the virtual address space of the process, together with the dynamic-linked libraries (DLL) related to the file. The address space of a process also stores various data structures, such as stacks. Each process represents at least one execution thread. A thread uses system resources (for example, files, system registry keys, synchronization objects, etc.) and the virtual address space of the process. The execution of the program code occurs by way of execution of the threads of the associated process. In performing security-related operations, the analysis of a process ordinarily involves examining all of the events occurring during the execution of the associated program code.

FIG. 1 illustrates an exemplary system 100 for event-based monitoring of processes according to one embodiment. A list of processes 110 is depicted, in which processes are executed at an arbitrary moment of time within the operating system. Usually, the list of the running processes includes several dozen (and oftentimes more) processes, depending on the number of launched applications. Notably, the depicted list of running processes 110 is simply an illustrative example. In the exemplary processes explorer.exe and VISIO.exe, as depicted, corresponding sequences of events occur.

In response to the launch of a process, process monitoring module 120 detects, and intercepts, the associated event. In one example, this can be accomplished via interception of a call for the function responsible for the launch of the process e.g., "CreateProcess," followed by creation of a corresponding entry of that action is into an events log. Process monitoring module 120 assigns an initial trust status to the process. In a related embodiment, if the process had been launched prior to the operation of process monitoring module 120, the process will nonetheless be intercepted and its trust status assessed. Accordingly, process monitoring module 120 classifies the process as trusted or not trusted, based on an analysis of the process's source—for example, the file from which the process was loaded.

In a related embodiment, the file analysis is made using a lookup in the trusted objects database 130, which contains information on all trusted files known at the moment of the analysis. Consequently, depending on the availability of information about the file in the database 130, the status of the process will be also determined. Therefore, if the database 130 contains information on the file, the status of the process will be determined as trusted. In the opposite case, if the database 130 does not contain information on the file, the status of the process will be determined as not trusted. In another embodiment, the analysis of the file can be performed based on a verification of a digital signature of the file, if one is available.

Then, in accordance with the currently-assigned trust status of the process, the process monitoring module 120 assigns at least one type of event for subsequent monitoring and analysis. Accordingly, for a process with a trusted status (in FIG. 1, the VISIO.EXE process is an example of such process), the process monitoring module 120 will track, among all the occurring events, only the essential events, information about which is contained in the essential events database 140. Essential events are events that must be monitored and analyzed regardless of the trust status, because the occurrence of these events is informative as to the trust status setting of an object. In other words, the trust status of an object may need to be changed in response to an occurrence of an essential event. Examples of essential events can be events indicating the launch or closure of an executable file, the opening (establishment) of a network connection or reading of a file.

For a process with a non-trusted status (in FIG. 1, the explorer.exe process is an example of such process), the process monitoring module 120 will track, among all the occurring events, both the essential events and the critical events, information about which is contained in the critical events database 150. Critical events are events, the occurrence of which is informative as to the execution of malicious code, or at least suspicious code, in an analyzed process. Suspicious code is code that may or may not actually be malicious, but has one or more characteristics that are indicative of a likelihood that the code is malicious. Examples of critical events can be events indicating the creation of a new file (CreateFile), new process (CreateProcess) and new thread (CreateThread/CreateRemoteThread), writing into a file (WriteFile), infiltration into an address space of a process by another process, change in OS settings (in particular, security settings), and access to the registry keys responsible for automatic loading. Malicious code is also suspicious code, but suspicious code is not always malicious.

It should be noted that in FIG. 1, in addition to essential and critical events, a third type of event is depicted, namely, insignificant events. Insignificant events are events that are not very important in terms of analyzing the hazardousness of the application's behavior, because such events can occur during the execution of both safe and malicious software, and during the execution of safe software only. Examples of insignificant events are events that occurred during the execution of a service code added by the compiler during the compilation of the software, or events related to the call for the current process name retrieval function, process threads number determination function, graphical window creation function, etc. Insignificant events will be ignored during the detection of essential and critical events in the thread of events. In addition, in one of the embodiments of the invention, detection and filtering of insignificant events is possible using a suitable algorithm for identifying and filtering out insignificant events, such as one using the decision criteria noted above.

After the detection of at least one monitored (essential or critical) event, depending on the process trust status, the process monitoring module 120 sends information on the detected event and on the current process trust status to the event processing module 160. The event processing module 160 analyzes the received information using the evaluation criteria, which is stored in the evaluation criteria database 170.

Depending on the embodiment of this invention, examples of the evaluation criteria determining the need to change the process trust status or file trust status can be the following:
    if the current process trust status is trusted, the status can be changed to non-trusted in case of detection of the following events:
        opening of a file with a current non-trusted status, when the antivirus module 180 is disabled;
        launch of a new thread in a process;
        creation of another process by a process;
        writing into the address space of another process;
        loading of a library from an alternative NTFS thread by a process;
        opening of a network connection with any remote resource (on either a local or a global network);
    if the current process trust status is non-trusted, the status can be changed to trusted in case of detection of the following events:
        if a "safe" verdict was received regarding a process from the antivirus module 180 (i.e. an antivirus check was performed on the file from which the process was launched, and the file and consequently the process were considered safe as a result of the check);
        if an analysis of the history of events completed at earlier launches of the file from which the process was launched was made in relation to the process, and the analysis did not detect any malicious actions (the analysis can be made either by the antivirus module 180 or by the event processing module 160).
    if the current file trust status is trusted, the status can be changed to non-trusted in case of detection of the following events:
        writing to the file remotely from another device through a network (local or global);
        modification of file content, if the modifying process has a non-trusted status.
    if the current file trust status is non-trusted, the status can be changed to trusted in case of detection of the following events:
        if a "safe" verdict was received regarding the file from the antivirus module 180 (i.e. an antivirus check was performed on the file, and the file was considered safe as a result of the check).

In addition, the files and processes being created inherit the trusted or non-trusted status from the process creating them. For example, if a process with an established trusted status creates a file (or a new process), then the file (or process) being created will also be assigned a trusted status. It should also be noted that the above-mentioned assessment criteria are examples and are not limited by them.

After performing the analysis, the event processing module 160 makes a decision as to the need to change the process trust status, which it sends to the processes monitoring module 120. Also, the event processing module 160 will make changes in the trusted objects database 130 in case of file trust status change. Such changes can be an addition of information about a new trusted file (which was previously unknown or non-trusted) to the database 130, or removal of the information about a trusted file from the database 130 because the file trust status became non-trusted.

The processes monitoring module 120, after receiving information from the event processing module 160, will change the current process trust status and will assign the relevant types of events for subsequent tracking.

Figure 2:
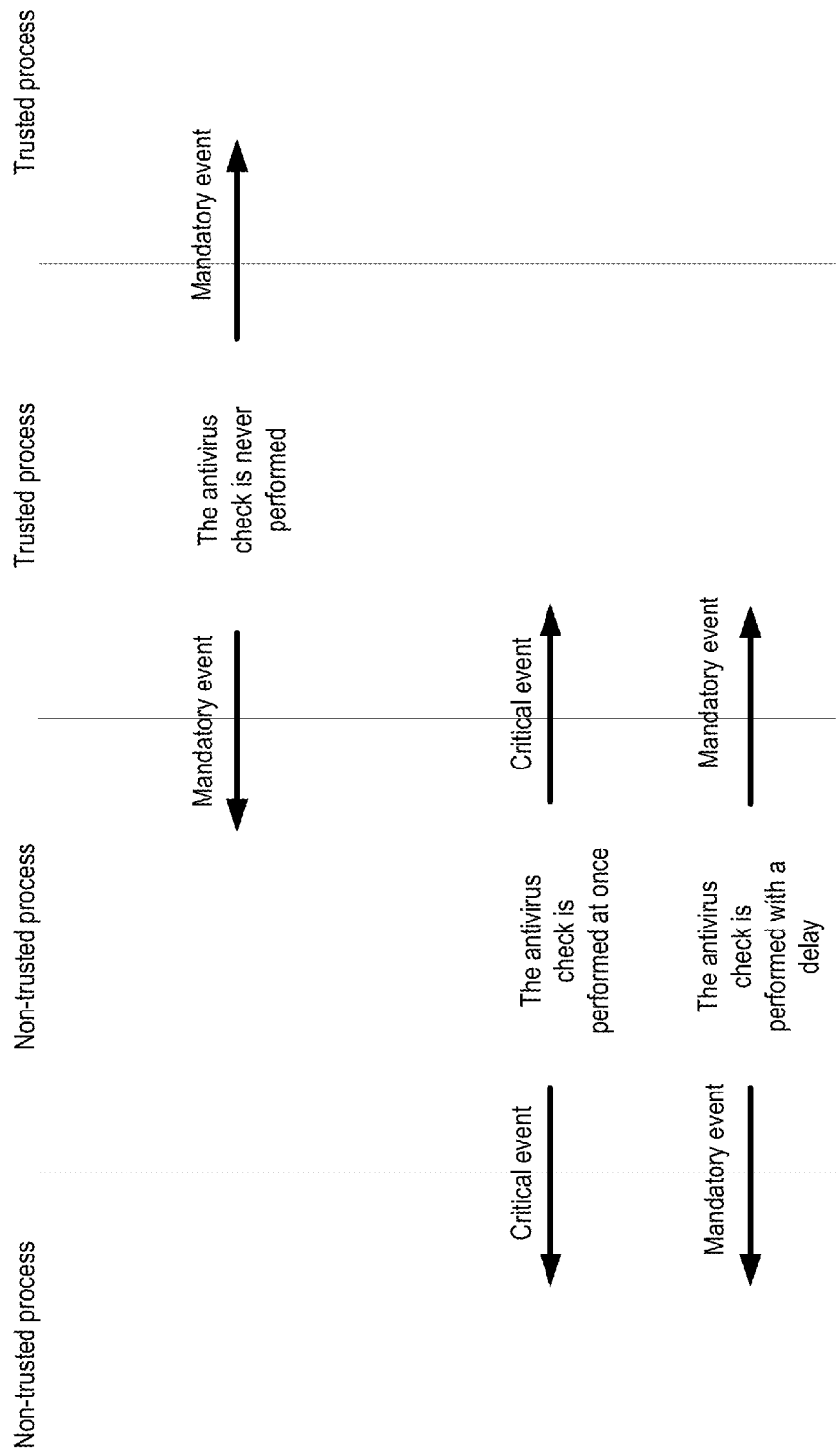
FIG. 2 is a diagram illustrating states, and changes of state of the trust status of a running process according to one aspect of the invention.

In one embodiment, the event processing module 160 also makes a decision on the need to perform an antivirus check of a file or process. This decision depends on the type of the received event and on the process trust status (see FIG. 2).

In case if the event is a critical event, the event processing module 160 will prompt the antivirus module 180 to immediately perform, as a high-priority task, a check of a non-trusted process (as it was described earlier, critical events are tracked only for non-trusted processes) and of the file from which the process was launched. The antivirus module 180 will perform the check and will provide a verdict on the maliciousness of the file to the event processing module 160. It should be noted that the file and process check methods depend on the capabilities of the antivirus module 180. The antivirus module 180 can use either a simpler type of check, such as a signature file analysis, or a more complicated type of check, allowing to perform a more detailed analysis—for example, using an expert system based on a completed events analysis. In case if the file is considered malicious, the file will be blocked, and, consequently, the process will be stopped. In the opposite case, if the file is "safe", the event processing module 160 will subsequently add that file to the trusted objects database 130 and will make a decision on the need to change the process trust status to "trusted process". After that, the decision will be sent to the processes monitoring module 120 for subsequent monitoring.

If the event is a essential one, and the process trust status is non-trusted, the antivirus module 180 will perform an antivirus check of the process and of the file in a non-urgent manner, i.e. as a background task, to avoid interfering with the user's main activity.

If the event is a essential one and the process trust status is trusted, the antivirus module 180 will not perform an antivirus check of the process and of the file.

Figure 3:
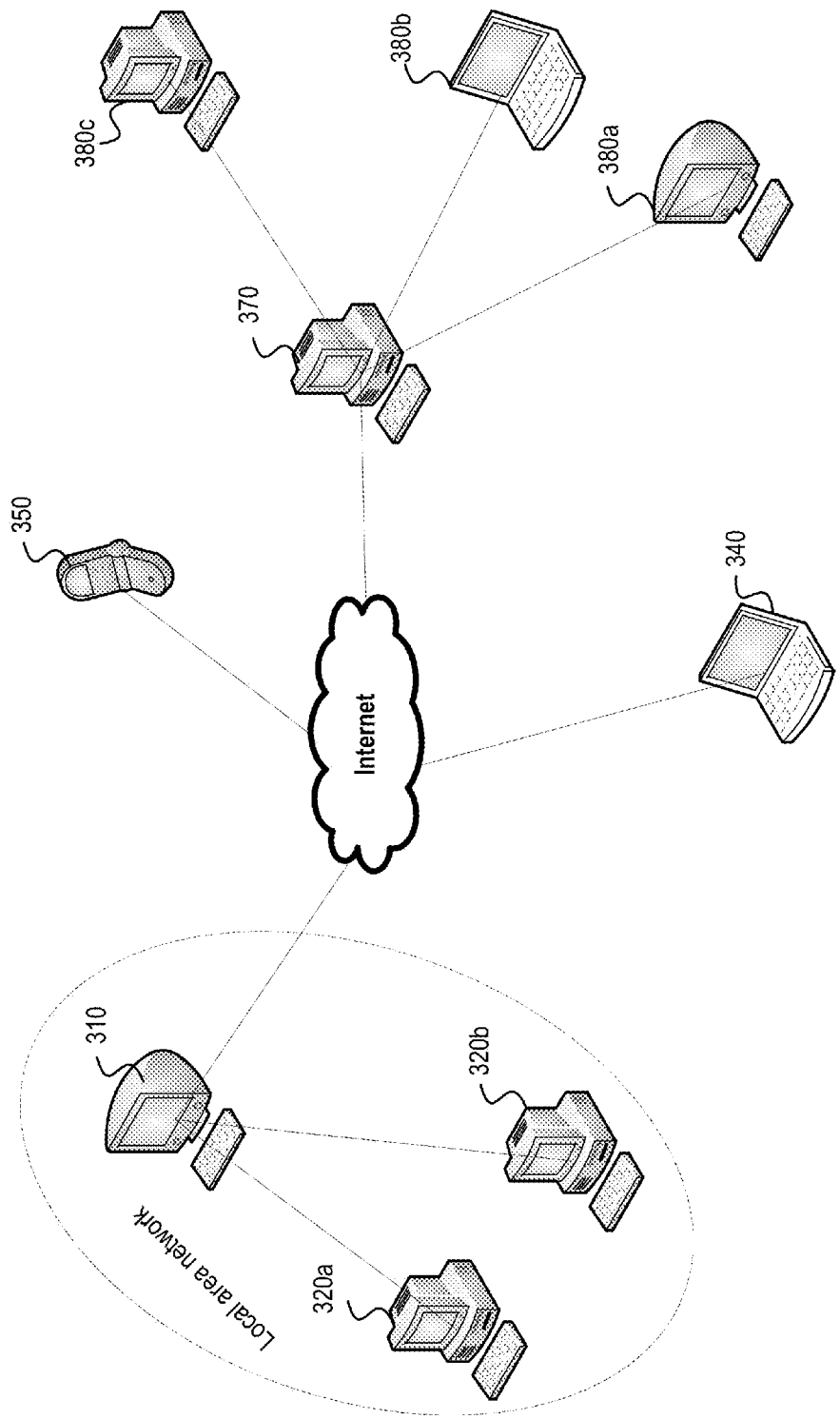
FIG. 3 is a diagram illustrating an example of interaction between computer devices for evaluating network connections with the purpose of increasing the level of analysis of processes, according to one embodiment.

FIG. 3 shows an example of interaction of computer devices (e.g., personal computers, mobile devices, etc.) for evaluation of network connections in order to increase the analysis level and to make a decision for the events indicating the network connection. Notably, network interactions are increasingly an integral part of many applications because in many cases, in order to operate properly, applications should (and often must) interact with one another or with outside (local or global) resources—for example, databases of application developers. Consequently, the above-described criterion (indicating that any network connection causes a change of the status to non-trusted) can create a situation when some applications will constantly be non-trusted, regardless of the various antivirus checks. Consequently, both databases (the essential events database 140 and the critical events database 150) will be constantly used during the monitoring of such applications, which can reduce the efficiency of the operating system.

The interaction between computer devices depicted in FIG. 3 includes the transfer of various items of information from one device to another. In addition, the devices can be located either on a local area network (for example, an intra-corporate network, or intranet), or on a wide-area network (for example, on the Internet). In one embodiment, polling is first performed among the devices 320, i.e. devices present on a local area network, and then among the devices 340-380, i.e. devices present on a world area network.

As one example, on device 310, an essential event indicating a network connection was detected. For example, assume the application from which the process being monitored was launched requested access to an outside resource. In addition, the device 310 cannot by itself determine the trust status of the resource with which the network connection occurred, because it encountered that resource for the first time. Then, the device 310 sends a request to the device 320a and 320b.

The request contains information on the detected essential event—for example, the name of the outside resource or the resource's address (URL). In case if any of the devices 320 has already evaluated this event and made a decision on the resource's trust status (e.g., trusted or non-trusted), this information will be sent to the device 310. In the opposite case, if the devices 320 do not have any information, the device 310 will request help from the devices on the world area network, namely, the devices 340-380.

In a related embodiment, in case the device 310 does not have direct access to the devices 380, device 310 will access the device 370, while the device 370 will, in turn, access the devices 380. After that, the device 370 will perform aggregation of the information received from the devices 380 and subsequent transfer of the gathered information to the device 310.

Therefore, the one aspect of the invention can, at the device 310, receive information about the detected network connection from other similar inventions installed on the devices 320-380. After that, this embodiment will, at the device 310, make its own decision on the trust status of the process and/or file being analyzed. It should be noted that the information gathered from other network devices can have various forms. An example of information is the result of the analysis of a similar event (or process), information on the trust status of a resource or PC with which network interaction was performed, or lists of safe devices, outside addresses (URL), safe applications, etc.

Another example of network connection analysis is a situation when network connection occurred between two devices containing the presented invention. In this case, the analysis of the network connection will be determined by the status of applications on both devices. Usually, the status will be passed on from the status of the application installed on the device being accessed. In other words, if device 310 identifies a network connection of an application with the application installed on the device 320a, and the device 320a also implements an embodiment of the invention, then the determination of the status of the application installed on the device 310 will use the information on the status of the application installed on the device 320a.

Figure 4:
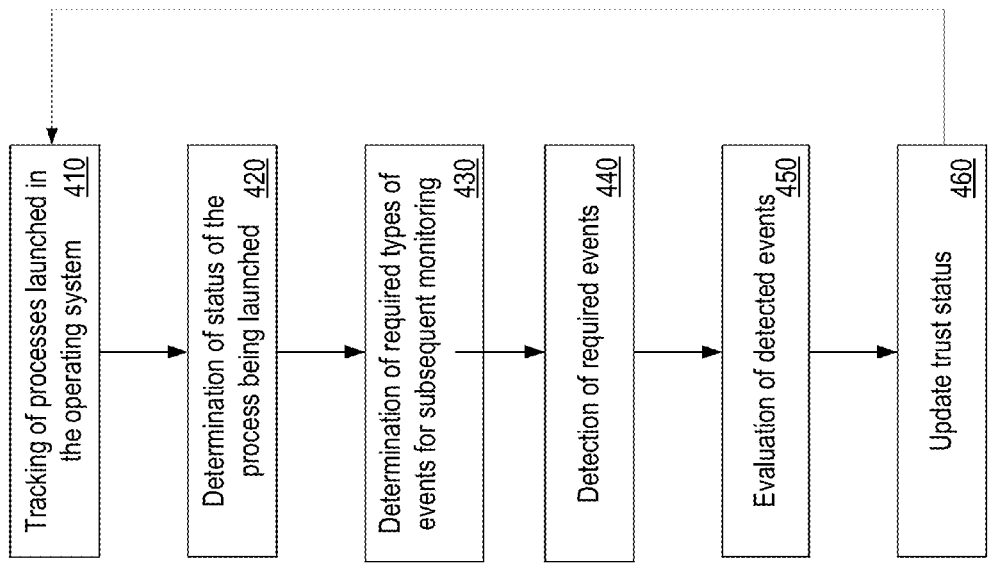
FIG. 4 is a flow diagram illustrating an operation algorithm carried out on a system for determining selectively performing malware analysis based on determining the dynamic trust status of objects, according to one aspect of the invention.

FIG. 4 is a flow diagram illustrating operation of a system for reducing the load on the operating system when an antivirus application is running according to one embodiment. At 410, process monitoring module 120 tracks the processes launched in the operating system. At the launch of a process, at 420, the process monitoring module 120 determines the trust status of the process being launched. The process trust status is determined by inheriting the status of the file from which the process was launched. The file trust status is, in turn, determined using the trusted objects database 130, which contains information on all trusted files known at the moment of the analysis. If the process trust status is determined to be trusted, then, at 430, the process monitoring module 120 sets the monitoring condition for only the essential events, as defined in the essential events database 140. In the opposite case, if the process trust status is determined to be non-trusted, then, at 430, the process monitoring module 120 sets monitoring conditions to monitor for critical events, as defined in critical events database 150. At 440, the process monitoring module 120 detects all required (essential only or critical) events with subsequent transfer of detected events and information on the process trust status to the event processing module 160. Then, at 450 event processing module 160, analyzes the received information using the evaluation criteria information stored in the evaluation criteria database 170, in order to make a decision on the need to change the process trust status. Then, the event processing module 160 sends the made decision to the process monitoring module 120, which, at 460, changes the status of the process being analyzed.

If the analyzed event is a critical event, then, at 450, the event processing module 160 will make a request for the antivirus module 180 to perform an antivirus check. After the antivirus check is performed, the antivirus module 180 will send the results of the check to the event processing module 160 for further evaluation of the event.

Figure 5:
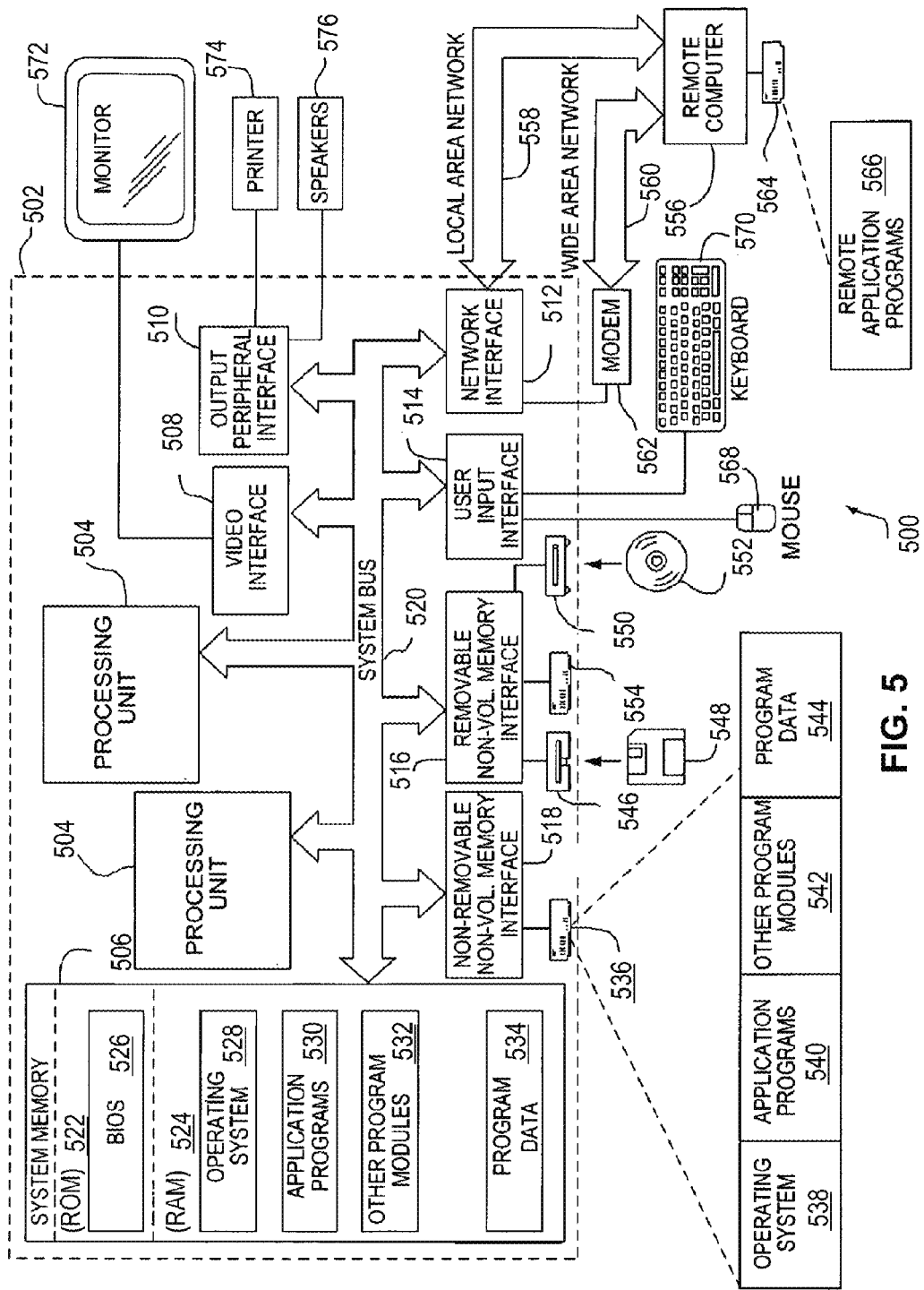
FIG. 5 is a diagram illustrating an example of a general-purpose computer system in which aspects of the invention can be implemented.

FIG. 5 is a diagram illustrating in greater detail a computer system 500 on which aspects of the invention as described herein may be implemented according to various embodiments. The computer system 500 may include a computing device such as a personal computer 502. The personal computer 502 includes one or more processing units 504, a system memory 506, a video interface 508, an output peripheral interface 510, a network interface 512, a user input interface 514, removable 516 and non-removable 518 memory interfaces and a system bus or high-speed communications channel 520 coupling the various components. In various embodiments, the processing units 504 may have multiple logical cores that are able to process information stored on computer readable media such as the system memory 506 or memory attached to the removable 516 and non-removable 518 memory interfaces 518. The computer 502 system memory 506 may include non-volatile memory such as Read Only Memory (ROM) 522 or volatile memory such as Random Access Memory (RAM) 524. The ROM 522 may include a basic input/output system (BIOS) 526 to help communicate with the other portion of the computer 502. The RAM 524 may store portions of various software applications such as the operating system 528, application programs 530 and other program modules 532. Further, the RAM 524 may store other information such as program or application data 534. In various embodiments, the RAM 524 stores information that requires low-latencies and efficient access, such as programs and data being manipulated or operated on. In various embodiments RAM 524 comprises Double Data Rate (DDR) memory, Error Correcting memory (ECC) or other memory technologies with varying latencies and configurations such as RAMBUS or DDR2 and DDR3. In this way, in various embodiments, the system memory 506 may store the input data store, access credential data store, operating memory data store, instruction set data store, analysis result data store and the operating memory data store. Further, in various embodiments, the processing units 504 may be configured to execute instructions that limit access to the aforementioned data stores by requiring access credential before access to the information is granted.

The removable 516 and non-removable 518 memory interfaces may couple the computer 502 to disk drives 536 such as SSD or rotational disk drives. These disk drives 536 may provide further storage for various software applications such as the operating system 538, application programs 540 and other program modules 542. Further, the disk drives 536 may store other information such as program or application data 544. In various embodiments, the disk drives 536 store information that doesn't require the same low-latencies as in other storage mediums. Further, the operating system 538, application program 540 data, program modules 542 and program or application data 544 may be the same information as that stored in the RAM 524 in various embodiments mentioned above or it may be different data potentially derivative of the RAM 524 stored data.

Further, the removable non-volatile memory interface 516 may couple the computer 502 to magnetic portable disk drives 546 that utilize magnetic media such as the floppy disk 548, Iomega® Zip or Jazz, or optical disk drives 550 that utilize optical media 552 for storage of computer readable media such as Blu-Ray®, DVD-R/RW, CD-R/RW and other similar formats. Still other embodiments utilize SSD or rotational disks housed in portable enclosures to increase the capacity of removable memory.

The computer 502 may utilize the network interface 512 to communicate with one or more remote computers 556 over a local area network (LAN) 558 or a wide area network (WAN) 560. The network interface 512 may utilize a Network Interface Card (NIC) or other interface such as a modem 562 to enable communication. The modem 562 may enable communication over telephone lines, coaxial, fiber optic, powerline, or wirelessly. The remote computer 556 may contain a similar hardware and software configuration or may have a memory 564 that contains remote application programs 566 that may provide additional computer readable instructions to the computer 502. In various embodiments, the remote computer memory 564 can be utilized to store information such as identified file information that may be later downloaded to local system memory 506. Further, in various embodiments the remote computer 556 may be an application server, an administrative server, client computers, or a network appliance.

A user may enter information to the computer 502 using input devices connected to the user input interface 514 such as a mouse 568 and keyboard 570. Additionally, the input device may be a trackpad, fingerprint scanner, joystick, barcode scanner, media scanner or the like. The video interface 508 may provide visual information to a display such as a monitor 572. The video interface 508 may be an embedded interface or it may be a discrete interface. Further, the computer may utilize a plurality of video interfaces 508, network interfaces 512 and removable 516 and non-removable 518 interfaces in order to increase the flexibility in operation of the computer 502. Further, various embodiments utilize several monitors 572 and several video interfaces 508 to vary the performance and capabilities of the computer 502. Other computer interfaces may be included in computer 502 such as the output peripheral interface 510. This interface may be coupled to a printer 574 or speakers 576 or other peripherals to provide additional functionality to the computer 502.

Various alternative configurations and implementations of the computer 502 are within the spirit of the invention. These variations may include, without limitation, additional interfaces coupled to the system bus 520 such as universal serial bus (USB), printer port, game port, PCI bus, PCI Express or integrations of the various components described above into chipset components such as the northbridge or southbridge. For example, in various embodiments, the processing unit 504 may include an embedded memory controller (not shown) to enable more efficient transfer of data from the system memory 506 than the system bus 520 may provide.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as will be understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present Application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A machine-implemented method for selectively performing malware analysis of objects residing in a computer system, the method comprising:
    assigning, by the computer system, an initial trust status to a first object, the trust status representing one of either a relatively higher trust level or a relatively lower trust level;
    based on the trust status, associating, by the computer system, the first object with an event type to be monitored, wherein the event type is selected from among: (a) essential events, occurrence of which is informative as to trust status evaluating for an object, and (b) critical events, including the essential events, and additional events, occurrence of which is informative as to execution of suspicious code;
    monitoring, by the computer system, occurrences of events relating to the first object wherein:
        in response to the first object being assigned the relatively higher trust level, only the essential events are monitored; and
        in response to the first object being assigned the relatively lower trust level, the critical events are monitored;
    in response to an occurrence of a monitored event relating to the first object, determining, by the computer system, a need for performing malware analysis of the first object based on the trust status of the first object and the event type, such that:
        in response to a detected occurrence of a critical event as a result of the monitoring, malware analysis of the first object is to be performed; and
        in response to a detected occurrence of an essential event as a result of the monitoring, malware analysis of the first object is to be performed if the trust status of the first object is the relatively lower trust level, and malware analysis of the first object is not to be performed if the trust status of the first object is the relatively higher trust level; and
    in response to determination of the need for performing the malware analysis, either performing, or forgoing, by the computer system, the malware analysis for the first object.

2. The method of claim 1, wherein detecting an occurrence of an action includes intercepting a function call.

3. The method of claim 1, wherein the objects include one or more object types selected from the group consisting of: processes, threads, files, data structures, or any combination thereof.

4. The method of claim 1, wherein assigning the initial trust status to the first object includes analyzing a monitored event relating to the first object.

5. The method of claim 1, wherein assigning the initial trust status to the first object includes responding to an antivirus check of a second object that relates to the first object.

6. The method of claim 1, wherein assigning the initial trust status to the first object includes identifying a source responsible for creation of the first object and comparing that source against a trust database to obtain the initial trust status.

7. The method of claim 1, wherein assigning the initial trust status to the first object includes verifying a digital signature associated with the first object.

8. The method of claim 1, wherein assigning the initial trust status to the first object includes assigning a trust status selected from the group consisting of: trusted, and un-trusted.

9. The method of claim 1, wherein essential events are selected from the group consisting of: events indicating a launch or closure of an executable file, events indicating establishment of a network connection, events indicating reading of a file, events indicating execution of a new process thread, events indicating a monitored process writing data into an address space of another process, events indicating an initiation of a new process by a monitored process, events indicating loading of a library into a monitored process from another process thread, events indicating modification of a file, or any combination thereof.

10. The method of claim 1, wherein critical events are selected from the group consisting of events indicating creation of a file, events indicating creation of a process, events indicating creation of a thread, events indicating writing into a file, events indicating infiltration into an address space of a process by another process, events indicating a change in operating system security settings, events indicating accessing of registry keys associated with automatic loading functionality, or any combination thereof.

11. The method of claim 1, further comprising:
    in response to determining the need for performing malware analysis of the first object, further determining a priority level for performance of the malware analysis.

12. The method of claim 1, wherein the monitoring of occurrences of events relating to first object includes excluding insignificant events from the monitoring.

13. The method of claim 1, further comprising:
    reevaluating the trust status of the first object in response to at least one of the occurrence of a monitored event relating to the first object being deemed suspicious, and a result of the malware analysis being indicative of suspiciousness of the first object.

14. The method of claim 13, wherein reevaluating the trust status of the first object includes comparing an event relating to the first object having occurred against a set of trust status evaluation criteria.

15. The method of claim 14, wherein the set of trust status evaluation criteria includes sequences of events, and wherein the event relating to the first object having occurred is part of a sequence of events being compared against the set of trust status evaluation criteria.

16. Apparatus for selectively performing malware analysis of objects residing in a computer system, comprising:
    set of instructions executable by computing hardware and stored in a non-transitory storage medium that, when executed, cause the computing hardware to implement:

a process monitoring module configured to monitor occurrence of events associated with a first object and, assign an initial trust status to a first object, the trust status representing one of either a relatively higher trust level or a relatively lower trust level;

the process monitoring module further configured to associate the first object with an event type to be monitored based on the trust status, wherein the event type is selected from among: (a) essential events, occurrence of which is informative as to trust status evaluation of an object, and (b) critical events, including the essential events, and additional events, occurrence of which is informative as to execution of suspicious code;

the process monitoring module further configured to monitor occurrences of events relating to the first object wherein:

in response to the first object being assigned the relatively higher trust level, only the essential events are monitored; and in response to the first object being assigned the relatively lower trust level, the critical events are monitored;

an event processing module configured to determine a need for performing malware analysis of the first object based on the trust status of the first object and the event type in response to an occurrence of a monitored event relating to the first object as detected by the process monitoring module, such that:

in response to a detected occurrence of a critical event as a result of the monitoring, malware analysis of the first object is to be performed; and in response to a detected occurrence of an essential event as a result of the monitoring, malware analysis of the first object is to be performed if the trust status of the first object is the relatively lower trust level, and malware analysis of the first object is not to be performed if the trust status of the first object is the relatively higher trust level; and an antivirus module configured to perform the malware analysis for the first object only in response to a positive determination of the need for performing the malware analysis by the event processing module.

17. The apparatus of claim 16, wherein the process monitoring module is configured to assign the initial trust status to the first object in response to an occurrence of a first event relating to the first object, wherein the process monitoring module is further configured to compare the first event against a database of trusted objects.

18. The apparatus of claim 16, wherein the process monitoring module is configured to assign the initial trust status to the first object in response to a result of the malware analysis by the antivirus module.

19. The apparatus of claim 16, wherein the process monitoring module is configured to assign the initial trust status to the first object in response to a result of a verification of a digital signature associated with the first object or with another object interacting with the first object.

20. The apparatus of claim 16, wherein essential events are selected from the group consisting of: events indicating a launch or closure of an executable file, events indicating establishment of a network connection, events indicating reading of a file, events indicating execution of a new process thread, events indicating a monitored process writing data into an address space of another process, events indicating an initiation of a new process by a monitored process, events indicating loading of a library into a monitored process from another process thread, events indicating modification of a file, or any combination thereof.

21. The apparatus of claim 16, wherein critical events are selected from the group consisting of: events indicating creation of a file, events indicating creation of a process, events indicating creation of a thread, events indicating writing into a file, events indicating infiltration into an address space of a process by another process, events indicating a change in operating system security settings, events indicating accessing of registry keys associated with automatic loading functionality, or any combination thereof.

22. The apparatus of claim 16, wherein the event processing module is configured to determine a priority level for performance of the malware analysis in response to determining the need for performing malware analysis of the first object.

23. The apparatus of claim 16, wherein the event processing module is further configured to:

reevaluate the trust status of the first object in response to at least one of the occurrence of a monitored event relating to the first object being deemed suspicious, and a result of the malware analysis being indicative of suspiciousness of the first object.

24. The method of claim 1, wherein in determining the need for performing malware analysis of the first object based on the trust status of the first object and the event type:

the malware analysis to be performed in response to a detected occurrence of a critical event as a result of the monitoring is to be performed at a relatively higher priority; and the malware analysis to be performed in response to a detected occurrence of an essential event as a result of the monitoring if the trust status of the first object is the relatively lower trust level is to be performed at a relatively lower priority.

25. The apparatus of claim 16, wherein the event processing module is further configured to determine the need for performing malware analysis of the first object based on the trust status of the first object and the event type such that:

the malware analysis to be performed in response to a detected occurrence of a critical event as a result of the monitoring is to be performed at a relatively higher priority; and the malware analysis to be performed in response to a detected occurrence of an essential event as a result of the monitoring if the trust status of the first object is the relatively lower trust level is to be performed at a relatively lower priority.

* * * * *